April 15, 1958     B. KLAUS     2,830,365
HAND OPERATED DRY SHAVER WITH SHEAR PLATE MOVING MEANS
Filed Feb. 28, 1955
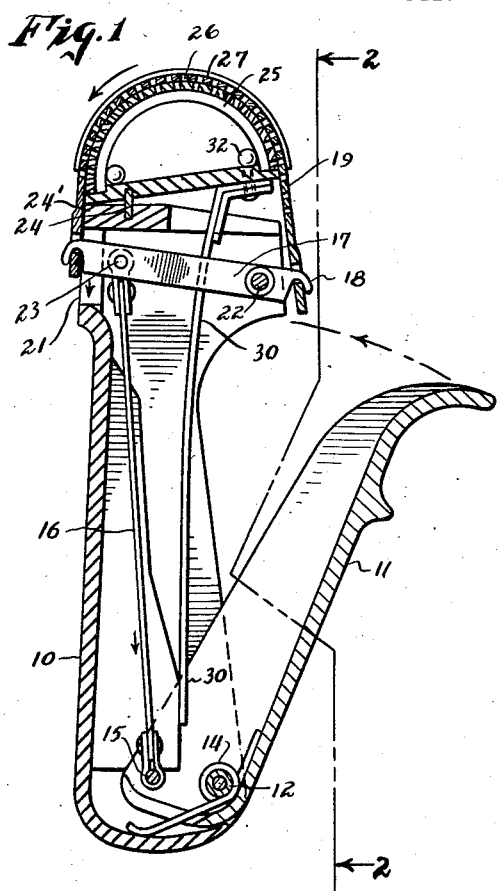
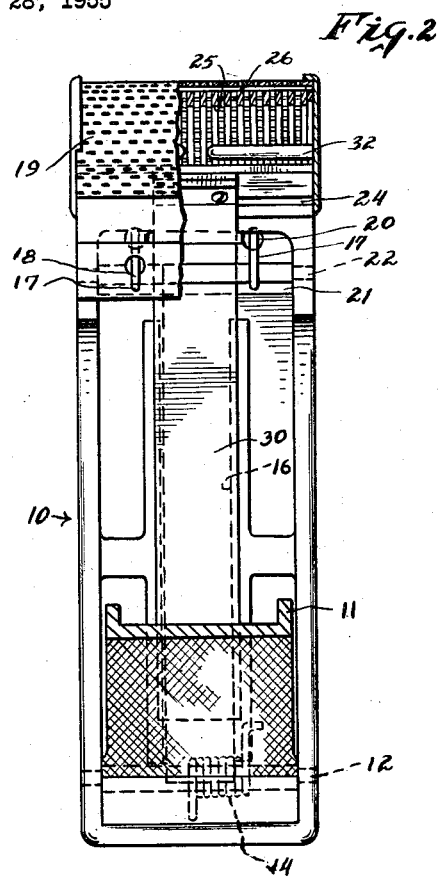
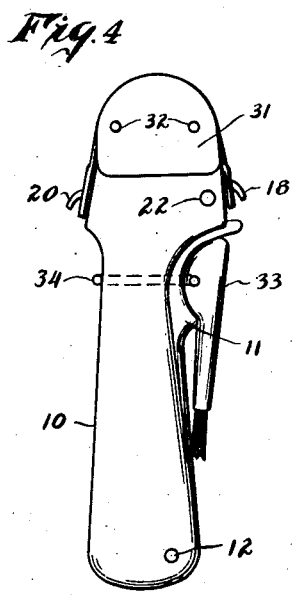
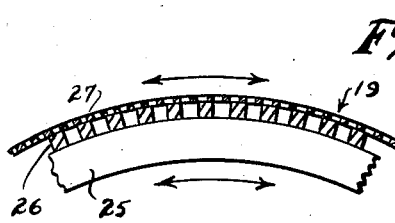
INVENTOR.
BENEDIKT KLAUS
BY
ATTORNEY

United States Patent Office 2,830,365
Patented Apr. 15, 1958

2,830,365

HAND OPERATED DRY SHAVER WITH SHEAR PLATE MOVING MEANS

Benedikt Klaus, Neustadt, Schwarzwald, Germany

Application February 28, 1955, Serial No. 491,090

1 Claim. (Cl. 30—43)

This invention relates to shavers and more particularly to dry shavers.

An object of the invention is to provide a dry shaver with a shearing action for hand operation.

A further object is to provide a hand operated dry shaver in which a shearing band is drawn backwards and forwards across a shearing comb.

A still further object is to provide a mechanism in which both the shearing band and the shearing comb move in a counter direction in order to double the cutting speed of the shaver.

Another object of the invention is to provide a shaver which will not press down the hair but which will cut off the hair close to the skin.

A still further object is to provide a dry shaver which requires no outside power but which is operated by hand simply and easily.

Further objects of the invention will be apparent from the accompanying drawings and following description.

In the drawings:

Fig. 1 is a cross-sectional view showing the operation of the dry shaver.

Fig. 2 is a view partly in section taken on the line 2—2 of Fig. 1.

Fig. 3 is a detailed view showing a shearing band and a shearing comb.

Fig. 4 is a perspective view of the dry shaver and cleaning brush in the closed position.

Referring more particularly to the drawings I provide a body member 10 of plastic of similar light material having a handle or operating lever 11 which is pivoted on the rod 12 within the body member 10. A spring 14 tends to urge the handle in the outward position and operates against the bottom of the body member 10 to urge the body member 10 to urge the operating lever 11 outwardly. The bands 16 are mounted on the pin 15.

Mounted in the upper portion of the shaver is the yoke 17 having finger 18 engaging a shearing band 19. The opposite end of the yoke 17 has fingers 20 engaging openings in the opposite end of the shearing band 19. The fingers 20 extend through the slots 21 in the housing and the yoke 17 is adapted to pivot on the rod 22 secured to the housing 10. The bands 16 are connected to the yoke 17 at 23.

Mounted on the pivot plate 24' on the extension 24 of the shaver is a shearing comb 25 having teeth 26 which cooperate with the openings 27 in the shearing band 19. Attached to the shearing comb is a spring member 30 which extends down into the body of the housing engaging a projection on the housing 10 and urging the front end of the shearing comb upward. When the handle 11 is pushed toward the main body of the housing 10 it pivots on the rod 12, thus exerting pressure on the spring member 30, forcing the pivot plate 24 downwardly while at the same time the movement of the bands 16 causes the yoke 17 to pivot in the opposite direction from the shearing comb and to move the shearing band over the teeth 26 in the opposite direction. This causes the shearing action between the comb and the band. Upon release of the handle the spring 30 and the spring 14 cause the parts to reciprocate in the opposite direction.

End plates 31 are provided with a pair of pins 32 to close the end of the shearing comb and a brush 33 with an arm 34 may be provided to hold the shaver in the closed position. The brush 33 is provided for cleaning purposes as well as for holding the shaver closed.

In operation the shearing band is held against the beard and the handle pressed inwardly toward the body 10. This exerts pressure against the spring 30 causing the shearing comb to rock toward the handle member while at the same time the band 16 exerts pressure on the yoke 17 to move the shearing band 19 across the face of the shearing comb, thus producing a shearing action between the openings 27 and the teeth 26. Upon release of pressure on the handle 11 the spring 14 as well as the spring 30 tend to move the handle away from the body and to move the shearing comb upwardly. As the handle moves away from the body the band 16 moves the yoke 17 into the upward position.

I claim:

A dry shaver including a housing, a handle pivoted to the bottom of said housing, a yoke pivoted adjacent one of its ends in the upper part of said housing and having its opposite end free to move, means connecting the free end of said yoke to the inner end of said handle at the bottom thereof, a shearing comb pivoted on said housing, spring means urging said shearing comb in one direction, a shearing band mounted over said shearing comb and engaging both ends of said yoke whereby when said handle is operated said shearing comb and said shearing band oscillate in opposite directions.

References Cited in the file of this patent

FOREIGN PATENTS

| | | |
|---|---|---|
| 591,395 | Great Britain | Aug. 15, 1947 |
| 833,464 | Germany | Mar. 10, 1952 |